United States Patent
Yuki et al.

(10) Patent No.: US 7,579,305 B2
(45) Date of Patent: Aug. 25, 2009

(54) FRICTION REGULATOR FOR LUBRICATING OIL AND LUBRICATING OIL COMPOSITION

(75) Inventors: Tsuyoshi Yuki, Kyoto (JP); Minoru Nishida, Kyoto (JP)

(73) Assignee: Sanyo Chemical Industries, Ltd., Kyoto-shi (JP)

( * ) Notice: Subject to any disclaimer, the term of this patent is extended or adjusted under 35 U.S.C. 154(b) by 711 days.

(21) Appl. No.: 10/509,426

(22) PCT Filed: Mar. 27, 2003

(86) PCT No.: PCT/JP03/03780

§ 371 (c)(1), (2), (4) Date: Apr. 18, 2005

(87) PCT Pub. No.: WO03/080773

PCT Pub. Date: Oct. 2, 2003

(65) Prior Publication Data

US 2006/0105924 A1    May 18, 2006

(30) Foreign Application Priority Data

Mar. 27, 2002  (JP) .............................. 2002-089729
Mar. 29, 2002  (JP) .............................. 2002-093681

(51) Int. Cl.
    *C10M 145/14*    (2006.01)
(52) U.S. Cl. .................. 508/423; 508/469; 508/471
(58) Field of Classification Search ................. 508/423, 508/469, 471
    See application file for complete search history.

(56) References Cited

U.S. PATENT DOCUMENTS

| 4,208,701 A | 6/1980 | Zaweski |
| 4,666,617 A * | 5/1987 | Katayama et al. ........... 508/436 |
| 5,191,029 A * | 3/1993 | DelDonno .................. 523/366 |

| 2002/0058749 A1* | 5/2002 | Larson et al. ............... 524/807 |

FOREIGN PATENT DOCUMENTS

| EP | 0 439 254 A2 | 7/1991 |
| EP | 439254 | 7/1991 |
| GB | 903701 | 8/1962 |
| JP | 38-009576 | 1/1961 |
| JP | 36-10331 | 7/1961 |
| JP | 38-9576 | 6/1963 |
| JP | 4-17463 | 8/1965 |
| JP | 40-017463 | 10/1966 |
| JP | 60-248796 | 12/1985 |
| JP | 4-309598 | 11/1992 |
| JP | 5-320618 | 12/1993 |
| JP | 6-184579 | 7/1994 |
| JP | 7-286189 | 10/1995 |
| JP | 11268187 A * | 10/1999 |
| JP | 2002-302687 | 10/2002 |

* cited by examiner

*Primary Examiner*—Glenn Caldarola
*Assistant Examiner*—Jim Goloboy
(74) *Attorney, Agent, or Firm*—Westerman, Hattori, Daniels & Adrian, LLP.

(57) ABSTRACT

The present invention provides
a friction modifier for a lubricating oil which comprises an oil-soluble copolymer (A) containing at least one unit of a monomer (a) represented by the general formula (1) and at least one unit of a monomer (b) represented by the general formula (2), and having a weight average molecular weight of 3,000 or more;

$$CH_2=C(R^1)-Q-(Z-A^1)_m-X \qquad (1)$$

$$CH_2=C(R^3)-CO-(O-A^2)_n-OR^4 \qquad (2)$$

a friction modifier composition comprising the above copolymer (A), and at least one species selected from the group consisting of a diluent and other additives; a lubricating oil composition comprising base oil, and the above friction modifier or friction modifier composition. These are excellent in the friction regulation effect, capable of reducing transmission shock, are high in the friction coefficient required for power transmission, and in addition, are excellent in wear resistance.

13 Claims, No Drawings

FRICTION REGULATOR FOR LUBRICATING OIL AND LUBRICATING OIL COMPOSITION

TECHNICAL FIELD

The present invention relates to a friction modifier for lubricating oils, and a lubricating oil composition.

More particularly, the present invention relates to a friction modifier for regulating the friction coefficient of lubricating oils for automobiles, a friction modifier composition, and a lubricating oil composition.

BACKGROUND ART

Conventionally, to lubricating oils for automobiles, a fatty acid amide or a fatty acid ester of oleyl amine and diethanolamine (U.S. Pat. No. 4,208,293), etc. are added as a friction modifier for reducing a shock of friction at the time of changing gear.

SUMMARY OF THE INVENITON

The present invention has for its object to provide a friction modifier capable of giving an improved torque transmission function to lubricating oils for automobiles.

Another object of the present invention is to provide a friction modifier capable of giving a shock reducing function at the time of changing gear to lubricating oils for automobiles.

Additional object of the present invention is to provide a lubricating oil for automobiles having a shock reducing function at the time of changing gear as well as an improved torque transmission function.

Further object of the present invention is to provide a lubricating oil for automobiles capable of saving fuel.

Much further object of the present invention is to provide a transmission oil, power-steering oil, shock absorber oil, traction oil or grease having a shock reducing function at the time of changing gear as well as an improved torque transmission function.

According to the present invention, the above-mentioned objects can be attained by a friction modifier for a lubricating oil which comprises an oil-soluble copolymer (A) containing at least one unit of a monomer (a) represented by the general formula (1) and at least one unit of a monomer (b) represented by the general formula (2), and having a weight average molecular weight of 3,000 or more.

$$CH_2=C(R^1)-Q-(Z-A^1)_m-X \quad (1)$$

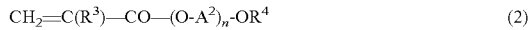

$$CH_2=C(R^3)-CO-(O-A^2)_n-OR^4 \quad (2)$$

In the above formulas (1) and (2), X is a polar group represented by the formula $-PH_2$, $-NH_2$ or $-(O)_a-P(=O)_b(OR^2)_2$ wherein either a or b is 1, and the other is 0 or 1. Two $R^2$s are the same or different and each represents H, an alkyl group having 1 to 24 carbon atoms, a group represented by the formula $-(A^1-Z)_m-Q-C(R^1)=CH_2$ or $M_{1/f}$ (M is a f valent cation, and f is 1 or 2). $R^1$ represents H or a methyl group, Z represents $-O-$ or $-NH-$, $A^1$ represents an alkylene group having 2 to 18 carbon atoms, and m represents an integer of 0, 1 or 2 to 50. Q represents $-CO-$ or a divalent hydrocarbon group having 1 to 22 carbon atoms, and when m is 0, Q represents a divalent hydrocarbon group having 1 to 22 carbon atoms. $R^3$ represents H or a methyl group, n represents an integer of 0 or 1 to 30, and $A^2$ represents an alkylene group having 2 to 18 carbon atoms. $R^4$ represents an aliphatic hydrocarbon group having 1 to 32 carbon atoms, an alicyclic hydrocarbon group having 5 to 7 carbon atoms, or an aralkyl group having 7 to 32 carbon atoms. When there are a plurality of $A^1$, $Z$, $Q$, $R^1$, m and $A^2$, each of them may be the same or different.

DETAILED DESCRIPTION OF THE INVENTION

The copolymer (A) has a weight average molecular weight (hereinafter, abbreviated as Mw) of generally 3,000 or more, preferably 3,000 to 500,000, more preferably 5,000 to 300,000, particularly preferably 8,000 to 100,000, and most preferably 10,000 to 35,000. In the present invention, Mw is determined as a polystyrene conversion molecular weight by gel permeation chromatography (GPC).

Moreover, the copolymer (A) is oil-soluble. In this specification, "oil-soluble" means a nature that at least 1 g of a substance is uniformly dissolved in 100 g of mineral oils (mineral oils having a kinetic viscosity of 2.3 $mM^2$/s at 100° C., and viscosity index of 83) at 40° C. Preferably, 5 g or more of the copolymer (A) is dissolved.

In the formula (1), among $R^2$ in the case where X is $-(O)_a-P(=O)_b(OR^2)_2$, alkyl groups having 1 to 24 carbon atoms (hereinafter, abbreviated as C) include, for example, methyl, ethyl, n- and iso-propyl, n-, iso-, sec- and tert-butyl, n-, iso-, sec- and neopentyl, hexyl, heptyl, n- and iso-octyl, 2-ethylhexyl, n- and iso-nonyl, n- and iso-decyl, n- and iso-dodecyl, n- and iso-tridecyl, n- and iso-tetradecyl, n- and iso-pentadecyl, n- and iso-hexadecyl, n- and iso-octadecyl, n-eicosyl, 2-ethyloctadecyl, 2-hexyltetradecyl, 2-octyldodecyl, docosyl, n-tetracosyl, and 2-decyltetradecyl groups. In view of the friction regulation effect of (A), preferred are C1-4 alkyl groups, and particularly preferred are methyl and ethyl groups.

The f valent cations M (f is 1 or 2) include H (proton), alkali metal cation, alkaline earth metal cation, $NH_4$, organic amine cation, quaternary ammonium cation, and combined use of two or more species of these.

Alkali metals constituting the cation include lithium, sodium, potassium, etc.; alkaline earth metals include calcium, magnesium, etc.;

Organic amines include primary, secondary and tertiary aliphatic amines (amines containing C1-20 alkyl group and/or C2-4 hydroxyalkyl group: diethylamine, triethylamine, monoethanol amine, monopropanol amine, etc.), alicyclic amines (cyclohexyl amine, dicyclohexyl amine, etc.), aromatic amines (aniline, toluidine, etc.), aromatic heterocyclic amines (pyridine, quinoline, etc.), heterocyclic amines (morpholine, N-methylmorpholine, piperazine, etc.); C2-4 hydroxyalkyl substitution product of N-position of these cyclic amines (N-hydroxyethyl morpholine, etc.); quaternary ammoniums include aliphatic and alicyclic quaternary ammonium, e.g. tetra(cyclo) alkylammonium [having C1-12 alkyl groups (methyl, ethyl, propyl, butyl, hexyl, octyl, dodecyl groups, etc.) and/or cycloalkyl groups (cyclohexyl group, etc.); four (cyclo)alkyl groups may be the same or different]. A (cyclo)alkyl group represents an alkyl group and/or cycloalkyl group, and hereinafter, the same expression is used.

Preferred among the cations is an organic amine cation, and particularly preferred is an aliphatic amine cation in view of oil solubility of (A).

As Q, Z, and $A^1$ in the case where $R^2$ is $-(A^1-Z)_m-Q-C(R^1)=CH_2$, there may be mentioned the following.

Divalent hydrocarbon groups having 1 to 22 carbon atoms of Q include straight chain and branched aliphatic hydrocarbon groups (e.g. methylene, ethylene, 1,2-propylene, 1,3-propylene, 1,2-butylene, 1,3-butylene, 1,4-butylene, 1,2-hexylene, 1,6-hexylene and 1,2-dodecylene groups), alicyclic hydrocarbon groups (e.g. cyclohexylene, cyclohexyl methylene, cyclohexyl ethylene, and cyclooctyl hexylene groups), and aromatic hydrocarbon groups (e.g. phenylene, phenylmethylene, phenylethylene, phenylhexylene, phenylbismethylene, and phenylbisethylene groups). Among these hydrocarbon groups, preferred are C1-10 ones, and particularly preferred are C1-2 ones.

Preferred among Q is an aliphatic hydrocarbon group (particularly a methylene group), and particularly preferred is —CO— in view of production easiness of the copolymer having a desired Mw.

Z is preferably —O— in view of production easiness of the monomer.

Examples of $A^1$ include C2-18 alkylene groups among said divalent aliphatic hydrocarbon groups of Q. C2-4 alkylene groups are preferred in view of production easiness of the monomer.

$-(Z-A^1)_m-$ represents oxyalkylene groups or aminoalkylene groups in the number of m. When Q is —CO—, m is preferably 1 or 2 to 20, more preferably 1 or 2 to 6, and particularly preferably 1. When Q represents a divalent hydrocarbon group having 1 to 22 carbon atoms, m may be 0, and preferably 0 or 1.

As Q, Z and $A^1$ of $CH_2=C(R^1)-Q-(Z-A^1)_m-$ in the formula (1), there may be mentioned same as above, and preferred ones are also the same.

The polar groups represented by the formula $-(O)_a-P(=O)_b(OR^2)_2$ of X include a phosphate group, phosphonic acid group, phosphorous acid group, and esters and salts thereof. Preferred are those in which b is 1, and particularly preferred are those in which both a and b are 1.

Among (a), as examples of the monomer in which X is $-(O)_a-P(=O)_b(OR^2)_2$, there may be mentioned the following (a1) to (a3).

(a1) Monomers in which a=1 and b=1;

(a11) Ones in which both $R^2$ s are H:
Monoalkenyl (C3-12) phosphate [e.g. mono(meth)allyl, mono(iso)propenyl, monobutenyl, monopentenyl, monooctenyl, monodecenyl, and monododecenyl phosphate], mono(meth)acryloyloxy alkyl (C2-12) phosphate [e.g. monomethacryloyloxy ethylphosphate (hereinafter, abbreviated as EPMA), monoacryloyloxy ethylphosphate, and mono(meth)acryloyloxy isopropylphosphate], and monomethacryloyl polyoxyethylene (polymerization degree of 2 to 20) phosphate (hereinafter, abbreviated as PEPMA), etc. As commercially available products, there may be mentioned "LIGHTESTER P-1M" (composition: EPMA) produced by Kyoeisha Chemical Co. Ltd., and "Phosmer PE" produced by Uni Chemical Co., Ltd (composition: PEPMA having a polymerization degree of 4 to 5), etc.

(a12) Ones in which at least one R is an alkyl group:
Monoalkenyl (C3-12) monoalkyl (C1-24) phosphate [e.g. allyl monomethyl and allyl monoethyl phosphate], monoalkenyl (C3-12) dialkyl (C1-24) phosphate [e.g. allyl dimethyl and allyl diethyl phosphate], and mono(meth)acryloyloxy alkyl (C2-12) monoalkyl (C1-24) phosphate [e.g. mono(meth)acryloyloxy ethyl monomethyl phosphate].

(a13) Ones in which at least one $R^2$ is $-(A^1-Z)_m-Q-C(R^1)=CH_2$;
Di(meth)acryloyloxy alkyl (C2-12) phosphate [e.g. dimethacryloyloxy ethylphosphate (hereinafter, abbreviated as DEPMA), diacryloyloxy ethyl, and di(meth)acryloyloxy isopropyl phosphate]. As commercially available products, there may be mentioned "LIGHTESTER P-2M" (composition: DEPMA) produced by Kyoeisha Chemical Co. Ltd., etc.

(a2) Monomers in which a=0 and b=1;

(a21) Ones in which both $R^2$s are H:
Alkene (C3-12) phosphonic acid [e.g. 2-propene-1-, 1-propene, decene and dodecene phosphonic acid], mono(meth)acryloyloxy alkane (C2-12) phosphonic acid [e.g. mono(meth) acryloyloxy ethane and mono(meth) acryloyloxy isopropane phosphonic acid], and mono(meth) acryloyl polyoxyethylene (polymerization degree of 2 to 20) phosphonic acid.

(a22) Ones in which at least one R is an alkyl group:
Monoalkyl (C1-24) monoalkene (C3-12) phosphonate [e.g. monomethyl and monoethyl 2-propene-1-phosphonate], dialkyl (C1-24) alkene (C3-12) phosphonate, [e.g. dimethyl and diethyl 2-propene-1-phosphonate], and monoalkyl (C1-24) mono(meth) acryloyloxy alkane (C2-12) phosphonate [e.g. monomethyl mono(meth) acryloyloxy ethanephosphonate].

(a23) Ones in which at least one $R^2$ is $-(A^1-Z) m-Q-C(R^1)=CH_2$;
(Meth) acryloyloxy alkyl (C2-12) (meth) acryloyloxy alkane (C2-12) phosphonate [e.g. (meth)acryloyloxyethyl (meth) acryloyloxy ethane and (meth)acryloyloxypropyl (meth)acryloyloxy propane phosphonate].

(a3) Monomers in which a=1 and b=0;

(a31) Ones in which both $R^2$s are H:
Monoalkenyl (C3-12) phosphite [e.g. monoallyl, monopropenyl, monodecenyl and monododecenyl phosphite], mono(meth)acryloyloxy alkyl (C2-12) phosphite [e.g. mono (meth)acryloyloxyethyl and mono(meth)acryloyloxy isopropyl phosphite], mono(meth)acryloyl polyoxyethylene (polymerization degree of 2 to 20) phosphite, etc.

(a32) Ones in which at least one $R^2$ is an alkyl group:
Monoalkenyl (C3-12) monoalkyl (C1-24) phosphite [e.g. allyl monomethyl and allyl monoethyl phosphite], monoalkenyl (C3-12) dialkyl (C1-24) phosphite [e.g. allyl dimethyl and allyl diethyl phosphite], and mono(meth) acryloyloxy alkyl (C2-12) monoalkyl (C1-24) phosphite [e.g. mono (meth) acryloyloxy alkylethyl monomethyl phosphite].

(a33) Ones in which at least one $R^2$ is $-(A^1-Z)_m-Q-C(R^1)=CH_2$;
Di(meth) acryloyloxy alkyl (C2-12) phosphite [e.g. di(meth) acryloyloxy ethyl and di(meth) acryloyloxy isopropyl phosphite].

Among (a), as a monomer (a4) in which X is $—PH_2$,
there may be mentioned monoalkenyl (C3-12) phosphine [e.g. monoallyl, monopropenyl, monodecenyl and monododecenyl phosphine], mono(meth) acryloyloxy alkyl (C2-12) phosphine [e.g. mono(meth) acryloyloxy ethyl and mono (meth) acryloyloxy isopropyl phosphine], mono(meth) acryloyl polyoxyethylene (polymerization degree of 2 to 20) phosphine, etc.

Among (a), as a monomer (a5) in which X is $—NH_2$, there may be mentioned monoalkenyl (C3-12) amine [e.g. monoallyl, monopropenyl, monodecenyl, and monododecenyl amine], mono(meth) acryloyloxy alkyl (C2-12) amine [e.g. mono(meth) acryloyloxy ethyl and mono(meth) acryloyloxy isopropylamine], mono(meth) acryloyl polyoxyethylene (polymerization degree of 2 to 20) amine, etc.

Among (A) in the present invention, a copolymer containing the monomer (a5) can be produced by a method comprising polymerizing a monomer mixture containing (a5), or a method comprising producing a copolymer (A0) by polymerizing a monomer mixture containing (a0), which is a precursor of (a5), and then converting a unit of (a0) into a unit of (a5).

In (a0), a monomer (a01) represented by the general formula (3) and a salt (a02) of the monomer (a5) are included.

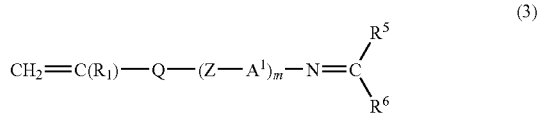

(3)

In the formula, $R^1$, Q, Z, $A^1$, and m are the same as those in the general formula (1), and preferred ones are also the same. $R^5$ and $R^6$ are the same or different and each represents H or C1-8 alkyl group, or $R^5$ and $R^6$ are coupled together to be an alkylene group having 3 to 11 carbon atoms, and thereby form a ring together with an adjacent carbon atom. Preferred as $R^5$ and $R^6$ are C1-4 alkyl group, and more preferred are methyl, ethyl and iso-butyl groups.

As examples of (a01), in the formula (3), there may be mentioned a monomer in which $R^1$ and $R^5$ represent methyl groups, $R^6$ represents an iso-butyl group, Q represents —CO—, Z represents —O—, $A^1$ represents an ethylene group, and m represents 1 (hereinafter, abbreviated as MIBKKA).

(A0) containing a unit of (a01) can be converted into an —$NH_2$ group by hydrolyzing an N=C bond. This bond can be hydrolyzed by heating it at 40 to 120° C. under stirring for 1 to 20 hours in water, an alkaline aqueous solution or an acidic aqueous solution.

As the alkaline aqueous solution, an aqueous solution of hydroxides of the alkali metals or alkaline earth metals mentioned above, ammonium or the aliphatic amine mentioned above (concentration: 10% by weight or less) can be used. As the acidic aqueous solution, an aqueous solution of an inorganic acid or C1-4 organic acid (concentration: 10% or less) can be used. As the inorganic acid, carbonic acid, sulfuric acid, hydrochloric acid, nitric acid, boric acid, phosphoric acid, etc. and as the organic acid, C1 to 4 carboxylic acid (e.g. formic acid, acetic acid, propionic acid, and butyric acid) can be used.

After the hydrolysis, in the case where —$NH_2$ forms an acid salt, it can be converted into —$NH_2$ by removing an acid with an ion-exchange resin, etc. Owing to the form of —$NH_2$ group, affinity for base oil becomes preferable as compared with a copolymer in the salt form. Among the hydrolysis methods, preferred is a method comprising carrying out hydrolysis with water or an alkaline solution, i.e. in the absence of an acid, and more preferred is a method comprising carrying out hydrolysis with water from a viewpoint that the production process is simple since the generated copolymer does not form a salt.

(a01) can be obtained, for example, when Q is —CO—, from (meth)acrylic acid or an ester thereof, or an amide formative derivative (inclusive of C1-6 alkyl ester, acid halide and acid anhydride), and Schiff's base represented by the following general formula (4).

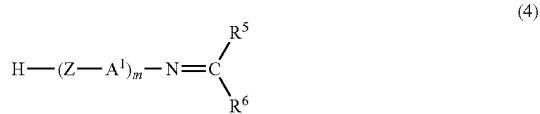

(4)

In the formula, $R^5$, $R^6$, Z, $A^1$ and m are the same as those in the above-mentioned general formula (3).

(A0) containing the unit of (a02) can be converted into a copolymer containing an —$NH_2$ group by removing an acid component with an ion-exchange resin, etc.

Among (A) containing an —$NH_2$ group, preferred is one obtainable from a precursor using (a01).

Among (a), preferred are (a2) and (a5), and particularly preferred is (a1) in view of the friction regulation effect. Among (a1), preferred are (a11), (a13), and combined use of (a11) and (a13), and particularly preferred are EPMA, DEPMA, PEPMA and combined use thereof. In the case of combined use, (a11) and (a13) are preferably used in combination in 50% or more, and particularly preferably 60 to 95% or more. Unless otherwise specified, in the above and the following description, % represents % by weight.

In the general formula (2), $R^3$ represents a hydrogen atom or a methyl group, and a methyl group is preferable. $A^2$ represents C2-18 alkylene group and, for example, there may be mentioned the same group as those of $A^1$ mentioned above, which is preferred. n represents an integer of 0 or 1 to 30, preferably 0 or 1 to 10, and more preferably 0.

As an aliphatic hydrocarbon group having 1 to 32 carbon atoms of $R^4$, there may be mentioned C1-32 straight chain or branched alkyl group, and C2-32 straight chain or branched alkenyl group.

As the alkyl group, there may be mentioned hexacosyl, octacosyl (2-dodecyl hexadecyl, etc.), triacosyl, and dotriacosyl groups (2-tetradecyl octadecyl group, etc.) other than the above-mentioned alkyl groups; as the alkenyl group, there may be mentioned vinyl, (meth)allyl, isopropenyl, butenyl, octenyl, decenyl, dodecenyl, pentadecenyl, octadecenyl, dococenyl, tetracocenyl, octacocenyl, and triacocenyl groups.

As C5-7 alicyclic hydrocarbon group of $R^4$, there may be mentioned cyclopentyl, cyclohexyl, cycloheptyl groups, etc. As C7-32 aralkyl group (straight chain or branched alkyl group), there may be mentioned benzyl, phenylethyl, phenylbutyl, phenylnonyl, phenyldodecyl groups, etc.

In the case where $A^2$ is C2-3, n is preferably an integer of 0 or 1 to 10, more preferably 0 or 1, and particularly preferably 0 in view of the oil solubility of (A).

Examples of (b) include the following.

(b1) C1-7 (preferably C1-6, more preferably C1-4, and particularly preferably C1) alkyl groups, C2-7 (preferably C2-3) alkenyl groups, (meth)acrylic acid esters containing C5-7 (preferably C6) cycloalkyl group or C7-8 aralkyl group: for example, methyl acrylate, methyl methacrylate (hereinafter, abbreviated as MMA), ethyl, butyl and hexyl (meth)acrylate; allyl and isopropenyl (meth)acrylate; cyclopentyl (meth)acrylate, cyclohexyl acrylate and cyclohexyl methacrylate (hereinafter, abbreviated as MA-CH); benzyl and phenylethyl (meth)acrylate.

(b2) (Meth)acrylic acid esters containing C8-32 (preferably C8-24, more preferably C12-24) alkyl group or alkenyl group, or C9-32 (preferably C9-18) aralkyl group: for example, dodecyl methacrylate (hereinafter, abbreviated as MA-12), tetradecyl methacrylate (hereinafter, abbreviated as MA-14), hexadecyl methacrylate (hereinafter, abbreviated as MA-16), octadecyl methacrylate (hereinafter, abbreviated as MA-18), 2-decyltetradecyl methacrylate (hereinafter, abbreviated as MA-24), dodecyl, tetradecyl, hexadecyl, octadecyl and 2-decyltetradecyl acrylate, 2-ethylhexyl, n-octyl, decyl, isodecyl, tridecyl, eicosyl, and tetracosyl (meth)acrylates; octenyl, decenyl, dodecenyl, octadecenyl (meth)acrylates, etc.

(b3) (Poly)alkylene (C2-18) glycol monoalkyl (C1-32, preferably C1-8), mono(meth)acrylic acid esters of alkenyl (C2-32, preferably C2-3) or aralkyl (C7-32, preferably C7-8) ethers: as the alkylene, alkyl, alkenyl and aralkyl groups, same groups as above may be mentioned, and the polymerization degree of alkylene glycol is preferably 1 to 20, and more preferably 1 to 10.

For example, there may be mentioned (poly)ethylene glycol (polymerization degree of 1 to 9) monomethylether, (poly)propylene glycol (polymerization degree of 1 to 5) monoethylether, ethylene glycol mono-2-ethylhexyl ether, polypropylene glycol (polymerization degree of 2 to 4) monobutylether mono(meth)acrylate, etc.

Among (b), preferred is combined use of two or more species among (b1) to (b3), and more preferred are combined use of one or two species among (b1) and two or more species among (b2), and particularly preferred is combined use of two to four species among (b2).

The weight ratio (b1)/(b2) in the case of combined use is preferably 50/50 to 2/98, and particularly preferably 35/65 to 3/97. If (b2) accounts for 50 or more, (A) easily becomes oil soluble, and if it is 98 or less, the friction regulation effect can be particularly preferably exerted. Moreover, the amount of [(b1)+(b2)] in (b) is preferably 80 to 100%, and more preferably 100% based on the weight of (b).

In addition, the monomer (b) preferably comprises 2 to 50% by weight of the monomer (b1) which is represented by the general formula (2) wherein n is 0 or 1, $R^4$ is an alkyl group having 1 to 7 carbon atoms, an alkenyl group having 2 to 7 carbon atoms, a cycloalkyl group having 5 to 7 carbon atoms, or an aralkyl group having 7 to 8 carbon atoms, and 50 to 98% by weight of the monomer (b2) which is represented by the general formula (2) wherein n is 0 or 1, $R^4$ is an alkyl group or an alkenyl group having 8 to 32 carbon atoms, or an aralkyl group having 9 to 32 carbon atoms.

The content of (a) based on the weight of (A) is preferably 0.01 to 50%, more preferably 0.05 to 40%, particularly preferably 0.1 to 15%, and most preferably 0.2 to 5%. It is preferable if the content of (a) is 0.01% or more in view of being excellent in the friction regulation effect. It is also preferable if the content of (a) is 50% or less in view of easily becoming oil soluble.

The content of (b) based on the weight of (A) is preferably 50 to 99.99%, more preferably 60 to 99.95%, particularly preferably 80 to 99.9%, and most preferably 90 to 99.8%.

(A) may optionally contain a constituent unit induced from other monomer (c) in addition to (a) and (b). As (c), there may be mentioned the following hydrophobic monomers (c1) and hydrophilic monomers (c2).

(c1) Hydrophobic monomers (c11) Aromatic vinyl hydrocarbons;

Styrene, substituted styrene (carbon atoms in a substituent: 1 to 18) [e.g. alkyl-substituted styrene (α-methylstyrene, vinyltoluene, 2,4-dimethyl styrene, p-ethyl styrene, p-isopropyl styrene and p-butyl styrene), cycloalkyl-substituted styrene (p-cyclohexyl styrene), phenyl-substituted styrene (p-phenyl styrene), aralkyl-substituted styrene (p-benzyl styrene), acyl-substituted styrene (p-acetoxy styrene), phenoxy-substituted styrene (p-phenoxy styrene)], divinyl-substituted aromatic hydrocarbons [e.g. divinyl benzene, divinyl toluene, and divinyl xylene]), vinyl naphthalene, etc.

(c12) Aliphatic vinyl hydrocarbons;

C2-30 chain alkene [e.g. ethylene, propylene, 1-butene, isobutylene, 1-pentene, 1-heptene, 4-methylpentene-1,1-hexene, diisobutylene, 1-octene, 1-dodecene, 1-octadecene and other α-olefins], C4-18 or preferably C4-5 chain alkadiene [e.g. butadiene, isoprene, 1,4-pentadiene, 1,6-hexadiene and 1,7-octadiene], and C6-30 alicyclic vinyl hydrocarbons [e.g. (di)cyclopentadiene, (vinyl)cyclohexene, ethylidene bicycloheptene, pinene, limonene and indene].

(c13) Alkyl alkenyl ethers;

Ethers of C1-30 straight chain or branched alkyl groups and C2-4 alkenyl groups, for example, alkyl vinyl ethers [e.g. methyl, ethyl and n-butyl vinyl ether], alkyl (meth)allyl ether [e.g. methyl, ethyl and n-butyl allyl ether], and alkyl(iso) propenyl ether may be mentioned. Preferred among these are methyl and ethyl vinyl ethers, and methyl and ethyl allyl ethers.

(c14) Esters equivalent to the monomer (b) of an unsaturated carboxylic acid other than (meth)acrylic acid;

Esters equivalent to the above-mentioned $R^4$ of an unsaturated monocarboxylic acid [(iso)crotonic acid, etc.] and an unsaturated dicarboxylic acid [maleic, fumaric and itaconic acid, etc.] alkyl (C1-24) diesters [dimethyl, diethyl and dioctyl maleate, dimethyl fumarate, etc.]

(c15) Aliphatic carboxylic acid alkenyl esters;

Vinyl, (meth)allyl and (iso)propenyl esters of C1-30 or preferably C2-18 straight chain, branched or cyclic, saturated or unsaturated aliphatic monocarboxylic acids (e.g. straight chain or branched saturated aliphatic carboxylic acids such as acetic acid, propionic acid, butyric acid, hexanoic acid, heptanoic acid, 2-ethylhexanoic acid and n-octanoic acid, cyclic saturated aliphatic carboxylic acids such as cyclohexanoic acid, cyclooctanoic acid and decahydronaphthylic acid, and straight chain unsaturated aliphatic carboxylic acids such as oleic acid, linoleic acid and linolenic acid.

(c16) Vinyl ketones;

Ketones constituted from C1-8 alkyl or C6-18 aromatic ring-containing hydrocarbon group and a vinyl group [e.g. methyl vinyl ketone, ethyl vinyl ketone, and phenyl vinyl ketone].

(c17) Halogen-containing vinyl monomers;

Vinyl chloride, vinyl bromide, vinylidene chloride, (meth) ally chloride, and halogenated styrene (mono- and dichloro styrenes, tetrafluoro styrene, allyl chloride, etc.)

(c2) Hydrophilic monomers (c21) Hydroxyl-containing vinyl monomers;

(Poly)alkylene glycol (polymerization degree of 1 to 20) mono(meth)acrylate [hydroxyethyl acrylate, hydroxyethyl methacrylate (hereinafter, abbreviated as MA-HE), diethylene glycol mono(meth)acrylate, etc.], vinyl alcohols (formed by hydrolysis of a vinyl acetate unit), C3-12 alkenol [(meth) allyl alcohol, (iso)crotyl alcohol, 1-octenol, 1-undecenol, etc.], C4-12 alkene diol [1-butene-3-ol, 2-butene-1-ol, 2-butene-1,4-diol, etc.], hydroxyalkyl (C1-6) alkenyl (C3-10) ethers [2-hydroxyethyl propenyl ether, etc.], and hydroxyl-containing aromatic vinyl monomers [p-hydroxystyrene, etc.].

(c22) Anionic monomers:

(c22-1) Carboxyl-containing vinyl monomers:

Unsaturated monocarboxylic acids [e.g. (meth)acrylic acid, α-methyl (meth)acrylic acid, crotonic acid, and cinnamic acid], unsaturated dicarboxylic acids [e.g. maleic acid, fumaric acid, and itaconic acid], monoalkyl (C1-24) esters of an unsaturated dicarboxylic acid [e.g. monomethyl maleate, monomethyl fumarate, monoethyl itaconate, and monooctyl maleate].

(c22-2) Sulfonic group-containing vinyl monomers:

C2-6 alkenesulfonic acids [vinylsulfonic acid, (meth)allyl sulfonic acid, etc.], C6-12 vinyl group-containing aromatic sulfonic acids [α-methylstyrene sulfonate, etc.], sulfonic group-containing (meth)acrylic ester monomers [sulfopropyl (meth)acrylate, sulfoethyl (meth)acrylate, etc.], sulfonic group-containing (meth)acrylamide monomers [2-(meth)

acrylamide-2-methylpropane sulfonic acid, etc.], vinyl monomers containing a sulfonic group and hydroxyl group [3-(meth)acrylamide-2-hydroxypropane sulfonic acid, 3-(meth) allyloxy-2-hydroxypropane sulfonic acid, 3-(meth) acryloyloxy-2-hydroxypropane sulfonic acid, etc.], alkyl (C3-18) (meth)allyl sulfosuccinate esters [dodecyl allyl sulfosuccinate, etc.], etc.

(c23) Nitrogen-containing monomers;

(c23-1) Amide group-containing vinyl monomers:

(Meth)acrylamide, monoalkyl (C1-4)-substituted (meth) acrylamides [N-methyl, N-ethyl, N-iso-propyl and N-n-butyl (meth)acrylamides], dialkyl (C1-4)-substituted (meth)acrylamides [N,N-dimethyl, N,N-diethyl and N,N-di-n-butyl (meth)acrylamides], N-vinyl carboxylic acid amides [N-vinyl formamide, N-vinyl acetoamide, N-vinyl-n-, and i-propionyl amides], etc.

(c23-2) Binary and tertiary amino group-containing vinyl monomers:

Binary amino group-containing vinyl monomers such as alkyl (C1-6) aminoalkyl (C2-6) (meth)acrylates [t-butyl aminoethyl methacrylate, methyl aminoethyl (meth)acrylate, etc.] and C6-12 dialkenyl amines [di(meth)allyl amine, etc.], tertiary amino group-containing vinyl monomers such as dialkyl (C1-4) aminoalkyl (C2-6) (meth)acrylates [dimethyl aminoethyl (meth)acrylate, diethyl aminoethyl (meth)acrylate, etc.], dialkyl (C1-4) aminoalkyl (C2-6) (meth)acrylamides [dimethyl aminoethyl (meth)acrylamide, diethyl aminoethyl (meth)acrylamide, etc.], tertiary amino group-containing aromatic vinyl monomers [N,N-dimethyl aminostyrene, etc.], nitrogen-containing hyterocycle-containing vinyl monomers [morpholinoethyl (meth)acrylate, 4-vinylpyridine, 2-vinylpyridine, N-vinylpyrrole, N-vinylpyrrolidone, N-vinylthio pyrrolidone, etc.].

(c23-3) Quaternary ammonium base-containing vinyl monomers:

There may be mentioned ones obtainable by converting the tertiary amino group-containing vinyl monomers mentioned in (c23-2) into quaternary forms using a quaternarzing agent (C1-12 alkyl chloride, dialkyl sulfate, dialkyl carbonate, benzyl chloride, etc.), and the like. Specifically, there may be mentioned (meth)acryloyl oxyalkyl quaternary ammonium salts such as (meth)acryloyl oxyethyl trimethyl ammonium chloride, (meth)acryloyloxyethyl triethyl ammonium chloride, (meth)acryloyloxyethyl dimethylbenzyl ammonium chloride, and (meth)acryloyloxyethyl methylmorpholinium chloride; (meth)acrylamide alkyl quaternary ammonium salts such as (meth)acrylamide ethyltrimethyl ammonium chloride, (meth)acrylamide ethyltriethyl ammonium chloride, and (meth)acrylamide ethyldimethylbenzyl ammonium chloride; and other quaternary ammonium base-containing vinyl monomers such as dimethyl diallyl ammonium methylsulfate, and trimethyl vinyl phenyl ammonium chloride.

(c23-4) Nitrile group-containing monomers:

(Meth)acrylonitrile, etc.

Among (c), preferred is (c2), more preferred are (c21), (c22-1) and (c23-2), and particularly preferred is (c21) in view of the friction regulation effect.

Moreover, in view of improving oil-solubility of (A), preferred is (c1). In the case where a copolymer consisting of (a) and (b) alone is not oil-soluble, it is preferable to use (c1), which are hydrophobic.

The weight ratio of (c) based on the weight of (A) is preferably 0 to 20%, more preferably 0.5 to 10%, and particularly preferably 1 to 8% in view of the friction regulation effect.

(A) can be produced by conventionally known radical polymerization methods such as a solution polymerization method, emulsion polymerization method, suspension polymerization method, reverse phase suspension polymerization method, thin film polymerization method, and spray polymerization method. Preferred is the solution polymerization method. Generally, (A) can be produced in a solvent in the presence of an initiator, and optionally a chain transfer agent, by radically polymerizing (a), (b), and optionally (c).

The solvents include high flash point solvents (flash point of 130° C. or more) such as mineral oils [refined oil in which a solvent is removed, hydrogenated reformed oil (e.g. high viscosity index oils having a viscosity index of 100 to 160), and naphthene oil] and synthetic lubricating oils [hydrocarbon synthetic lubricating oil (poly α-olefin synthetic lubricating oil, etc.), and ester synthetic lubricating oil]; other solvents [aliphatic hydrocarbon (pentane, hexane, etc.), aromatic hydrocarbon (toluene, xylene, etc.), alcohol solvents [isopropyl alcohol (hereinafter, abbreviated as IPA), octanol, butanol, etc.], ketone solvents (methyl isobutyl ketone, methyl ethyl ketone, etc.), amide solvents (N,N-dimethylformamide, N-methylpyrrolidone, etc.), sulfoxide solvents (dimethyl sulfoxide, etc.)], and combined use of two or more species of these. Preferred are high flash point solvents, aromatic hydrocarbon and alcohol solvents, and particularly preferred is IPA.

The initiators include an azo initiator, peroxide initiator, and redox initiator.

As the azo initiator, there may be mentioned 2,2'-azobis (2,4-dimethyl valeronitrile) (hereinafter, abbreviated as AVN), 2,2'-azobis isobutyronitrile, 2,2'-azobis(2-methyl butyronitrile), azobis cyano valerate and salts thereof (e.g. hydrochloride, etc.), 2,2'-azobis(2-amidinopropane)hydrochloride, 2,2'-azobis(2-methyl-N-(2-hydroxyethyl)propionamide, etc.

As the peroxide initiator, there may be mentioned inorganic peroxides [e.g. hydrogen peroxide, ammonium persulfate, potassium persulfate, sodium persulfate, etc.], and organic peroxides [e.g. benzoyl peroxide, di-t-butyl peroxide, cumene hydroperoxide, succinic acid peroxide, di(2-ethoxyethyl)peroxy dicarbonate, t-butylperoxy pivarate, t-hexyl peroxy pivarate, t-butylperoxy neoheptanoate, t-butylperoxy neodecanoate, t-butylperoxy 2-ethylhexanoate, t-butylperoxy isobutyrate, t-amylperoxy 2-ethylhexanoate, 1,1,3,3-tetramethyl butylperoxy 2-ethylhexanoate, dibutylperoxy trimethyladipate, lauryl peroxide, etc.]

The redox initiators include ones comprising a combination of reducing agents such as sulfite and bisulfite of alkali metals (e.g. ammonium sulfite, ammonium bisulfite, etc.), ferrous chloride, ferrous sulfate and ascorbic acid, and oxidizing agents such as persulfate of an alkali metal, ammonium persulfate, hydrogen peroxide and an organic peroxide.

The chain transfer agents include, for example, mercaptans [n-lauryl mercaptan (hereinafter, abbreviated as LSH), mercaptoethanol, mercaptopropanol, etc.], thiocarboxylic acids (thioglycolic acid, thiomalic acid, etc.), secondary alcohols (isopropanol, etc.), amines (dibutylamine, etc.), hypophosphites (sodium hypophosphite, etc.), and the like.

The polymerization temperature is preferably 30 to 140° C., more preferably 50 to 130° C., and particularly preferably 70 to 120° C. The polymerization temperature is controlled by a heat insulation polymerization technique or a temperature control polymerization technique.

Moreover, other than by heating, the polymerization can be initiated by radiating radiant rays, electron rays, ultraviolet rays, etc. Preferred is a temperature-controlled solution polymerization method.

Furthermore, the copolymerization may be carried out by either a random addition polymerization or mutual copolymerization, and also may be carried out by either a graft copolymerization or a block copolymerization.

The friction modifier composition of the present invention comprises the friction modifier of the present invention and a diluent and/or other additive.

The dissolution into base oil becomes easy by dissolving and diluting the friction modifier with a diluent.

As the diluent, the solvents mentioned in the above production method of (A) can be used, and the solvent used in the polymerization process may be left without removing. Among the diluents, preferred are the above-mentioned mineral oils, and particularly preferred is a hydrogenated reformed oil.

The dissolution of the friction modifier into the diluent is carried out optionally under heating (preferably 40 to 150° C.).

The content of (A) in the friction modifier composition in the case where the diluent is used is preferably 1% or more, more preferably 20 to 90%, and particularly preferably 30 to 80%. The content of the diluent is preferably 99% or less, more preferably 10 to 80%, and particularly preferably 20 to 70%.

As the other additive in the friction modifier composition, there may be mentioned a copolymer (B). (B) is a copolymer which contains the unit of (b) mentioned above, and optionally the unit of (c) mentioned above, and does not contain the unit of (a).

Among (b), preferred are (b1), (b2), and combined use of these, more preferred are (b2), and combined use of (b1) and (b2), and particularly preferred are combined use of two or more species of (b2), and combined use of MMA and (b2).

(B) comprising (b2) and not comprising (b1) is preferable in view of exerting the pour point depressing effect in the below-mentioned lubricating oil composition. And in view of exerting the viscosity index improving effect of the below-mentioned lubricating oil composition, (B) comprising (b1) and (b2) is preferable.

The preferable weight ratio ((b1)/(b2)) in the case where (b1) and (b2) are combinedly used is (2 to 50)/(50 to 98)%, and more preferably (10 to 35)/(65 to 90)%.

Preferable (c) which can be optionally contained are (c11), (c12), (c14) and (c15) among (c1), and (c21) and (c23) among (c2). More preferred are (c21) and (c23-2).

The ratio of (c) based on the weight of (B) is generally 0 to 20%, and preferably 1 to 10%.

Mw of (B) is generally 5,000 to 300,000, and preferably 20,000 to 100,000. Preferable Mw of (B) comprising (b2) and not comprising (b1) is 50,000 to 70,000.

The ratio of (B) based on the weight of the friction modifier composition is generally 0 to 50%, and preferably 0 to 20%.

The other additives include further other arbitrary ingredients such as detergents [Ca and Mg salts such as sulfonate type, salicylate type, phenate type and naphthenate type ones, and calcium carbonate], dispersants [succinimido type ones (e.g. bis type, mono type, borate type, and Mannich condensate type)], antioxidants [zinc dithiophosphate, amine type ones (diphenyl amine, etc.), hindered phenol type ones, zinc thiophosphate, trialkyl phenol, etc.], conventionally known friction modifiers [long chain fatty acids (e.g. oleic acid), long chain fatty acid esters (e.g. oleate), long chain amine type ones (e.g. oleyl amine), long chain amides (e.g. oleamide)], antiwear agents [e.g. molybdenum dithiophosphate, molybdenum dithiocarbamate, and zinc dialkyl dithiophosphate], extremepressure agents [e.g. phosphorous sulfur type, sulfur type, phosphorous type, and chloro type ones], antifoaming agents [e.g. silicone oil, metal soap, fatty acid ester, and phosphate ester], anti-emulsification agents [e.g. quaternary ammonium salt, sulfated oil and phosphate ester], and corrosion inhibitors [benzotriazol and 1,3,4-thiodiazolyl-2,5-bis-dialkyl dithiocarbamate].

As for these addition amounts, based on the weight of the friction modifier composition, the detergent is generally 0 to 40% and preferably 0.1 to 30%, the dispersant is generally 0 to 20% and preferably 0.2 to 10%, the antioxidant is generally 0 to 5% and preferably 0.1 to 3%, the conventional friction modifier is generally 0 to 5% and preferably 0.1 to 3%, the antiwear agent and extreme-pressure agent are generally 0 to 40% and preferably 0.1 to 30%, the antifoaming agent is generally 0 to 10,000 ppm and preferably 10 to 4,000 ppm, the anti-emulsification agent is generally 0 to 15% and preferably 0 to 1%, and the corrosion inhibitor is generally 0 to 3% and preferably 0 to 2%.

The total amount of other additive in the friction modifier composition is generally 0 to 60%, and preferably 0.1 to 40%.

The other additive may be either blended with base oil after a friction modifier composition is composed, or each of them may be separately blended with base oil, and in such case, the blending order is not particularly restricted.

The friction modifier of the present invention can exert not only the friction regulation effect but also the wear prevention effect, dispersion effect, oxidization prevention effect, viscosity index improving effect, etc.

The friction modifier of the present invention can be suitably used in a wide rage of fields such as engine oils (for gasoline, diesels, etc.), transmission oils [gear oils (for industrial use, automobiles), automatic shift oils (automatic transmission oil, troidal CVT oil, belt CVT oil)], power steering oils, shock absorber oils, traction oils, greases, etc. Preferably, the modifier is used as a transmission oil, more preferably used as an automatic shift oil, and particularly preferably used as a gear oil for automobiles, automatic transmission oil for automatic shift having an automatic slip control mechanism, and belt CVT oil, since the oils become excellent in fuel saving ability, and effective in comfort for having no adverse effect on shudder performance.

The lubricating oil composition of the present invention comprises base oil, the above-mentioned friction modifier or the friction modifier composition, and contains 0.01 to 40% by weight of the copolymer (A) based on the weight of base oil.

The base oil which can be used for the lubricating oil composition of the present invention is not particularly restricted, and there may be mentioned, for example, the above-mentioned mineral oils and synthetic lubricating oils, etc. Preferred are high viscosity index mineral oils having a viscosity index of 100 to 160, hydrocarbon synthetic lubricating oils, and ester synthetic lubricating oils. In addition, the cloud point (JIS K2269) of the base oil is preferably −5° C. or lower, and more preferably −15° C. to −70° C. When the cloud point is within this range, the precipitation amount of wax is small, and the viscosity at low temperature becomes preferable. Moreover, the kinetic viscosity of base oil is preferably 1 to 14 mm$^2$/s at 100° C.

In the lubricating oil composition of the present invention, the content of (A) based on the weight of base oil is generally 0.01 to 40%, and preferably 0.03 to 30%.

In addition, when the lubricating oil composition is used as an engine oil, the content of (A) based on the weight of base oil is preferably 0.1 to 15%. When it is used as a gear oil, the content is preferably 0.1 to 15%, when it is used as an automatic shift oil (automatic transmission oil, belt CVT oil, etc.) and operating oil, the content is preferably 0.1 to 20%, and when it is used as a traction oil, the content is preferably 0.1 to 20%.

Moreover, the content of (A)+(B) based on the weight of base oil is generally 0.01 to 40%, and preferably 0.03 to 30%.

BEST MODE FOR CARRYING OUT THE INVENTION

In the following, the present invention is described by means of examples. However, these examples are no limitative of the present invention. In the following, part(s) represents part(s) by weight.

[Method for Measuring Mw by GPC]
Equipment: HLC-802A produced by Toyo Soda Manufacturing Co., Ltd.
Column: TSK gel GMH6×2
Measurement temperature: 40° C.
Sample solution: 0.5% tetrahydrofuran solution
Injection amount of solution: 200 μl
Detection equipment: Refractive index detector
Standard: Polystyrene

[Method for Measuring the Friction Coefficient and Transmission Shock Reducing Ability]
By the method according to JASO M 348-95, μd (1,800 rpm) at 500 cycles as a friction coefficient, and μ0 (3,600 rpm)/μd (1,800 rpm) at 500 cycles as transmission shock reducing ability are measured.

The nearer the value of μ0/μd is to 1.0, the higher the transmission shock reducing ability becomes, and the larger the value of μd is, the higher the friction coefficient becomes.

By the method according to JASO M 348-95, μd (1,800 rpm) at 500 cycles as a friction coefficient, and μ0/μd at 500 cycles as a transmission shock index are measured. The nearer the value of μ0/μd is to 1.0, the lower the transmission shock becomes, and the larger the value of μd is, the higher the friction coefficient becomes.

[Method for Measuring Wear Resistance]
Using SRV, wear mark diameters of balls are measured by ball-on-disk equipment.
Wear mark diameter: average value of the vertical and horizontal diameter of a wear mark of a ball
Equipment: Optimol SRV testing machine (Nihon Parkerizing Co., Ltd.)
Ball: 10 mm in diameter
Disk: 24 mm in diameter×7.9 mm in thickness
Load: 200 N
Stroke width: 2 mm
Frequency: 50 Hz
Examination time: 10 minutes

EXAMPLES 1 TO 12

A reaction vessel equipped with a stirrer, heating and cooling device, thermometer, dropping funnel, and nitrogen inlet tube was charged with 2,500 parts of IPA as a polymerization solvent, and the nitrogen substitution of the gaseous phase in the reaction vessel was carried out. Then, while refluxing the content under sealed condition at 75 to 85° C., a monomer-initiator solution having the composition shown in Table 1 was added dropwise thereto using the dropping funnel at uniform rate over 3 hours, and further the mixture was matured at the same temperature for 1 hour. The obtained polymer solution was heated to 120° C., and the solvent was removed under reduced pressure to obtain 10,000 parts of copolymers (A-1) to (A-12) having Mw shown in Table 1. To 5,200 parts of the friction modifier comprising (A-1) to (A-12) of the present invention, 4,800 parts of mineral oil (hydrogenated reformed oil: kinetic viscosity at 100° C. of 2.3 mm²/s, and viscosity index of 83) were added and dissolved uniformly at 120° C. to obtain the friction modifier compositions of the present invention (V-1) to (V-12). Furthermore, the friction modifier composition and a high viscosity index oil ["YUBASE 3" (product of SK Corp.), viscosity index: 107] of the amount shown in Table 1 were mixed to obtain the lubricating oil compositions (F-1) to (F-12) of the present invention.

EXAMPLES 13 AND 14

The same reaction vessel as used in Example 1 was charged with the polymerization solvent shown in Table 2, and the nitrogen substitution of the gaseous phase in the reaction vessel was carried out. Then, the solvent was heated to 85° C. under sealed condition at 85° C. A monomer-initiator solution having the composition shown in Table 2 was added dropwise thereto using the dropping funnel at uniform rate over 2 hours, and further the mixture was matured for 2 hours at the same temperature. Thereafter, 924 parts of water was added, and the mixture was heated and stirred at 85° C. for 2 hours to be hydrolyzed. The resultant was then heated to 120° C., water and toluene were removed under reduced pressure, the obtained copolymer was re-precipitated with methanol, washed with 8,700 parts of methanol twice, and dried under reduced pressure at 100° C. for 4 hours to obtain copolymers (A-13) and (A-14) of the amounts and Mw shown in Table 2.

To the friction modifier comprising (A-13) or (A-14) of the present invention, equal amount of the same mineral oil as in Example 1 was added, and the mixture was dissolved uniformly at 120° C. to obtain the friction modifier compositions (V-13) and (V-14) of the present invention. Furthermore, these compositions and a high viscosity index oil (YUBASE 3) of the amounts shown in Table 2 were mixed to obtain the lubricating oil compositions (F-13) and (F-14) of the present invention.

ComparativeExamples 1 and 2

Except that the monomer-initiator solutions having the compositions shown in Table 2 were used, the polymerization temperature was changed to 85° C., and the solvent was not removed, polymerization was carried out in the same manner as Example 1 to obtain YUBASE 3 solutions comprising copolymers (B-1) and (B-2). These solutions were diluted with hydrogenated reformed oil in such manner that the copolymer/diluent ratio became as shown in Table 2 to obtain the friction modifier compositions (Y-1) and (Y-2) of Comparative Examples. In addition, the diluents in copolymer/diluent in Table 2 include hydrogenated reformed oil used for the dilution and YUBASE 3 used for the polymerization. Furthermore, in the same manner as Example 1, these were mixed with a high viscosity index oil (YUBASE 3) in the ratio shown in Table 2 to obtain lubricating oil compositions (Z-1) and (Z-2) of Comparative Examples.

Comparative Example 3

995 parts of (Z-1) was added with 5 parts of oleyl amine to obtain the lubricating oil composition (Z-3) of Comparative Example 3.

TABLE 1

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Product name of copolymer | | | A-1 | A-2 | A-3 | A-4 | A-5 | A-6 | A-7 | A-8 | A-9 | A-10 | A-11 | A-12 |
| Monomer-initiator solution | (a) | P-1M | 300 | 300 | 300 | 90 | 50 | 300 | 200 | 200 | 300 | 300 | — | — |
| | | PhosmerPE | — | — | — | — | — | — | — | — | — | — | 300 | 200 |
| | (b1) | MMA | 1,700 | 1,600 | 900 | 1,600 | 1,600 | 2,800 | 1,180 | 1,180 | 1,700 | 1,700 | 1,700 | 1,180 |
| | | MA-CH | — | — | 2,500 | — | — | — | — | — | — | — | — | — |
| | (b2) | MA-12 | 5,000 | 3,600 | 4,300 | 3,810 | 3,850 | — | — | — | 5,000 | 5,000 | 5,000 | — |
| | | MA-14 | 3,000 | 2,500 | — | 2,500 | 2,500 | — | — | — | 3,000 | 3,000 | 3,000 | — |
| | | MA-16 | — | 2,000 | 2,000 | 2,000 | 2,000 | 3,000 | 5,000 | — | — | — | — | 5,000 |
| | | MA-18 | — | — | — | — | — | — | — | 3,120 | — | — | — | 3,120 |
| | | MA-24 | — | — | — | — | — | 3,900 | 3,120 | — | — | — | — | — |
| | (c) | MA-HE | — | — | — | — | — | — | 500 | 500 | — | — | — | 500 |
| | | IPA | 1,000 | 1,000 | 1,000 | 1,000 | 1,000 | 1,000 | 1,000 | 1,000 | 1,000 | 1,000 | 1,000 | 1,000 |
| | | LSH | 100 | 100 | 100 | 100 | 100 | 100 | 100 | 100 | 250 | 70 | 100 | 100 |
| | | AVN | 50 | 50 | 50 | 50 | 50 | 50 | 50 | 50 | 50 | 50 | 50 | 50 |
| Mw of copolymer | | | 28,200 | 28,100 | 29,500 | 28,500 | 28,600 | 28,800 | 28,700 | 28,800 | 12,000 | 40,000 | 28,600 | 28,900 |
| Lublicating oil composition | Product name | | F-1 | F-2 | F-3 | F-4 | F-5 | F-6 | F-7 | F-8 | F-9 | F-10 | F-11 | F-12 |
| | Friction modifier composition | | 220 | 220 | 220 | 220 | 220 | 220 | 220 | 220 | 300 | 180 | 220 | 220 |
| | YUBASE 3 | | 880 | 880 | 880 | 880 | 880 | 880 | 880 | 880 | 700 | 820 | 880 | 880 |

TABLE 2

| | | | Example | | Compar. Example | |
|---|---|---|---|---|---|---|
| | | | 13 | 14 | 1 | 2 |
| Product name of copolymer | | | A-13 | A-14 | B-1 | B-2 |
| Monomer-initiator solution | (a) | MIBKMA | 1,275 | 1,368 | — | — |
| | (b1) | MMA | 425 | 240 | 2,000 | 1,275 |
| | | MA-CH | — | — | — | — |
| | (b2) | MA-12 | 5,525 | 6,892 | 3,600 | 7,225 |
| | | MA-14 | — | — | 3,600 | — |
| | | MA-16 | 935 | — | 800 | — |
| | | MA-18 | 340 | — | — | — |
| | | MA-24 | — | — | — | — |
| | (c) | MA-HE | — | — | — | — |
| | | LSH | 85 | 85 | 100 | 100 |
| | | AVN | 34 | 34 | 50 | 50 |
| Polymerization solvent | Toluene | | 1,500 | 1,500 | — | — |
| | YUBASE 3 | | — | — | 2,500 | 2,500 |
| Mw of copolymer | | | 28,500 | 27,800 | 28,500 | 26,700 |
| Weight (part) of copolymer | | | 8,000 | 7,960 | 10,000 | 8,500 |
| Copolymer/Diluent | | | 50/50 | 50/50 | 52/48 | 52/48 |
| Lublicating oil composition | Product name | | F-13 | F-14 | Z-1 | Z-2 |
| | Friction modifier composition | | 240 | 240 | 220 | 220 |
| | YUBASE 3 | | 760 | 760 | 780 | 780 |

As regarding these lubricating oil compositions, μd, μ0/μd, and wear mark diameters were determined. The results are shown in Table 3.

TABLE 3

| | | Lublicating oil composition | μd | μ0/μd | Wear mark diameter (mm) |
|---|---|---|---|---|---|
| Example | 1 | F-1 | 0.143 | 1.1 | 0.567 |
| | 2 | F-2 | 0.142 | 1.1 | 0.560 |
| | 3 | F-3 | 0.143 | 1.1 | 0.565 |
| | 4 | F-4 | 0.143 | 1.1 | 0.575 |
| | 5 | F-5 | 0.137 | 1.1 | 0.582 |
| | 6 | F-6 | 0.144 | 1.1 | 0.566 |
| | 7 | F-7 | 0.145 | 1.1 | 0.568 |
| | 8 | F-8 | 0.144 | 1.1 | 0.569 |
| | 9 | F-9 | 0.143 | 1.1 | 0.565 |
| | 10 | F-10 | 0.135 | 1.1 | 0.570 |
| | 11 | F-11 | 0.142 | 1.1 | 0.576 |
| | 12 | F-12 | 0.142 | 1.1 | 0.578 |
| | 13 | F-13 | 0.134 | 1.1 | 0.585 |
| | 14 | F-14 | 0.135 | 1.1 | 0.585 |
| Compar. Ex. | 1 | Z-1 | 0.118 | 1.3 | 0.630 |
| | 2 | Z-2 | 0.116 | 1.4 | 0.633 |
| | 3 | Z-3 | 0.108 | 1.0 | 0.600 |

INDUSTRIAL APPLICABILITY

The friction modifier, friction modifier composition, and lubricating oil composition of the present invention are excellent in the friction regulation effect, capable of reducing transmission shock, are high in the friction coefficient required for power transmission, and in addition, are excellent in wear resistance.

The invention claimed is:

1. A friction modifier composition for a lubricating oil which comprises an oil-soluble copolymer (A) and a diluent, said oil-soluble copolymer (A) containing at least one unit of a monomer (a) represented by the general formula (1) and at least one unit of a monomer (b) represented by the general formula (2), and having a weight average molecular weight of 3,000 or more:

$$CH_2=C(R^1)-Q-(Z-A^1)_m-X \qquad (1)$$

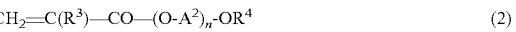

$$CH_2=C(R^3)-CO-(O-A^2)_n-OR^4 \qquad (2)$$

in the formula, X is a polar group represented by the formula $—PH_2$, $—NH_2$ or $—(O)_a—P(=O)_b(OR^2)_2$; either of a or b is 1, and the other is 0 or 1; two $R^2$s are the same or different and each represents H, an alkyl group having 1 to 24 carbon atoms, a group represented by the formula $-(A^1-Z)_m-Q-C(R^1)+CH_2$ or a cation of $M_{1/f}$; M is a f valent cation; f is 1 or 2; $R^1$ represents H or a methyl group; Z represents —O—; $A^1$ represents an alkylene group having 2 to 18 carbon atoms; m represents an integer of 1 or 2 to 50; Q represents —CO—; $R^3$ represents H or a methyl group; n represents an integer of 0 or 1 to 30; $A^2$ represents an alkylene group having 2 to 18 carbon atoms; $R^4$ represents an aliphatic hydrocarbon group having 1 to 32 carbon atoms, an alicyclic hydrocarbon group having 5 to 7 carbon atoms, or an aralkyl group having 7 to 32 carbon atoms; when there are a plurality of $A^1$, $R^1$, m and $A^2$, they may be the same or different, and said diluent being at least one selected from the group consisting of high flash point solvent having flash point of 130° C. or more, aliphatic hydrocarbons, alcohol solvents, amide solvents, and sulfoxide solvents.

2. The friction modifier composition according to Claim 1, wherein X is represented by the formula $-(O)_a-P(=O)_b(OR^2)_2$.

3. The friction modifier composition according to Claim 1, wherein X is $-NH_2$.

4. The modifier according to Claim 3, wherein the copolymer (A) is obtainable by hydrolyzing a copolymer (A0) containing a unit induced from a monomer (a01) represented by the general formula (3):

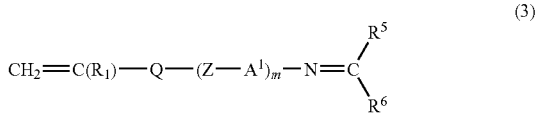

(3)

in the formula, $R^1$, Q, Z, $A^1$, and m are the same as those in the general formula (1); $R^5$ and $R^6$ are the same or different and each represents H or an alkyl group having 1 to 8 carbon atoms, or $R^5$ and $R^6$ are coupled together to be an alkylene group having 3 to 11 carbon atoms, and thereby form a ring together with an adjacent carbon atom.

5. The friction modifier composition according to claim 4, wherein the copolymer (A) is obtainable by hydrolyzing the copolymer (A0) in the absence of an acid.

6. The friction modifier composition according to claim 1, wherein the copolymer (A) contains 0.01 to 50% by weight of the unit induced from the monomer (a).

7. The friction modifier composition according to claim 1, wherein said monomer (b) comprises 2 to 50% by weight of a monomer (b1) and 50 to 98% by weight of a monomer (b2), said monomer (b1) being represented by the general formula (2), in the formula, n is 0 or 1, $R^4$ is an alkyl group having 1 to 7 carbon atoms, an alkenyl group having 2 to 7 carbon atoms, a cycloalkyl group having 5 to 7 carbon atoms, or an aralkyl group having 7 to 8 carbon atoms, and said monomer (b2) being represented by the general formula (2), in the formula, n is 0 or 1, $R^4$ is an alkyl group or an alkenyl group having 8 to 32 carbon atoms, or an aralkyl group having 9 to 32 carbon atoms.

8. The friction modifier composition according to claim 7 wherein n is 0.

9. The friction modifier composition according to claim 1, wherein (A) has a weight average molecular weight of 3,000 to 500,000.

10. The friction modifier composition according to claim 1, which further comprises at least one selected from the group consisting of a copolymer (B), detergent, dispersants, antioxidants, conventionally known friction modifiers, antiwear agents, extreme pressure agents, antifoaming agents, antiemulsification agents, and corrosion inhibitors, said copolymer (B) containing the unit of the monomer (b), and optionally the unit of other monomer (c), and not containing the unit of the monomer (a).

11. The friction modifier composition according to claim 1 which comprises 20 to 90% by weight of (A) and 10 to 80% by weight of the diluent.

12. A lubricating oil composition which comprises base oil, and the friction modifier composition according to claim 1, and 0.01 to 40% by weight of the copolymer (A) on the basis of the weight of the base oil.

13. The lubricating oil composition according to claim 12, wherein the base oil is at least one species selected from the group consisting of a mineral oil having high viscosity index of 100 to 160, a hydrocarbon synthetic lubricating oil, and an ester synthetic lubricating oil.

* * * * *

UNITED STATES PATENT AND TRADEMARK OFFICE
CERTIFICATE OF CORRECTION

PATENT NO.        : 7,579,305 B2
APPLICATION NO.   : 10/509426
DATED             : August 25, 2009
INVENTOR(S)       : Tsuyoshi Yuki et al.

It is certified that error appears in the above-identified patent and that said Letters Patent is hereby corrected as shown below:

In the claims;
In Claim 1 on Line 63, Column 16 change

"– $(A^1\text{-}Z)_m$ –Q-C($R^1$)+$CH_2$"

To be

-- – $(A^1\text{-}Z)_m$ –Q-C($R^1$)=$CH_2$ --

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO.      : 7,579,305 B2
APPLICATION NO. : 10/509426
DATED           : August 25, 2009
INVENTOR(S)     : Yuki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 991 days.

Signed and Sealed this

Fourteenth Day of September, 2010

David J. Kappos
*Director of the United States Patent and Trademark Office*